June 8, 1965  C. M. McLEAN, JR., ETAL  3,187,663
COFFEE BREWER
Filed May 16, 1963  3 Sheets-Sheet 1

Clarence M. McLean, Jr.
Alvis D. Warren
INVENTORS

June 8, 1965 C. M. McLEAN, JR., ETAL 3,187,663
COFFEE BREWER
Filed May 16, 1963 3 Sheets-Sheet 2
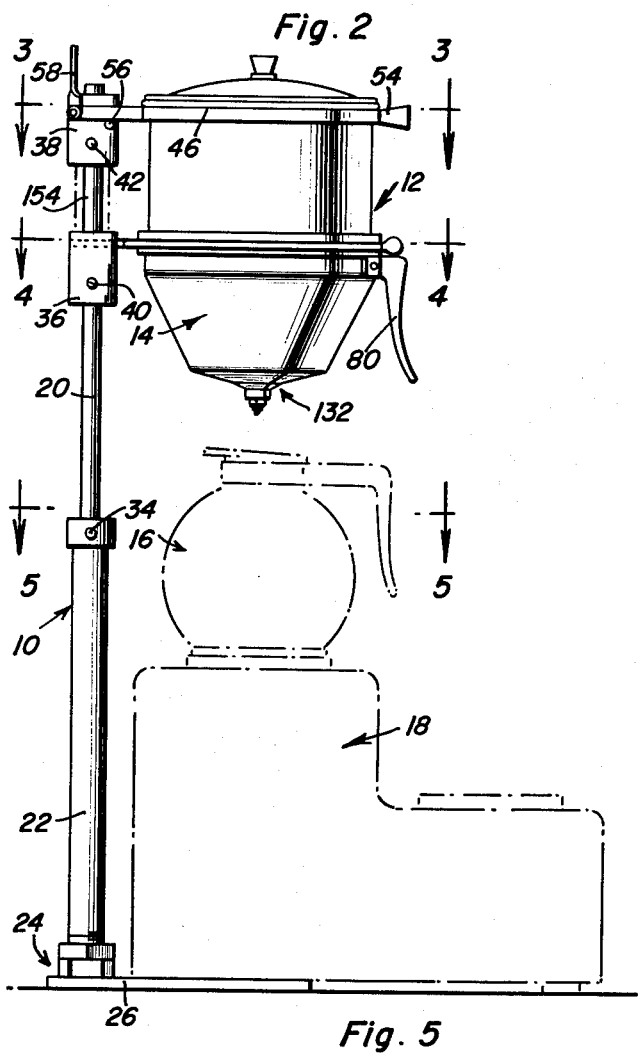
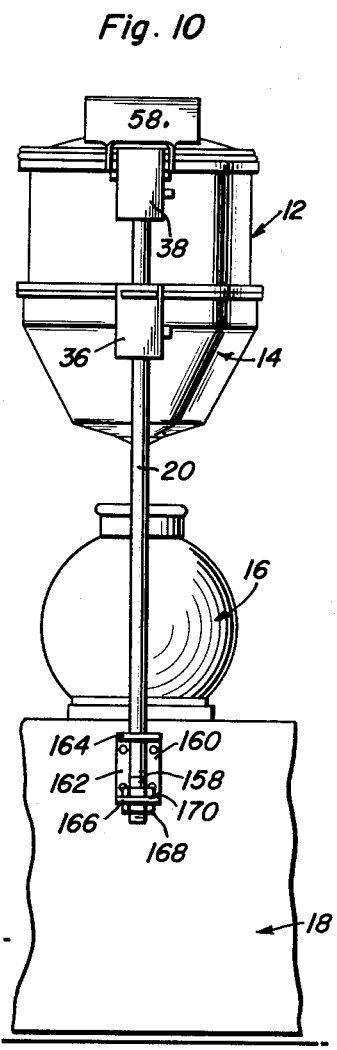
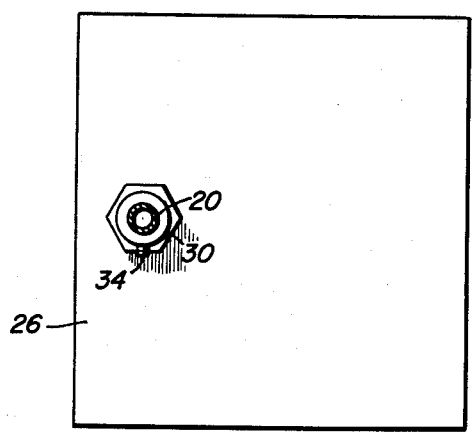
Clarence M. McLean, Jr.
Alvis D. Warren
INVENTORS
BY *Clarence A. O'Brien*
*and Harvey B. Jackson*
Attorneys

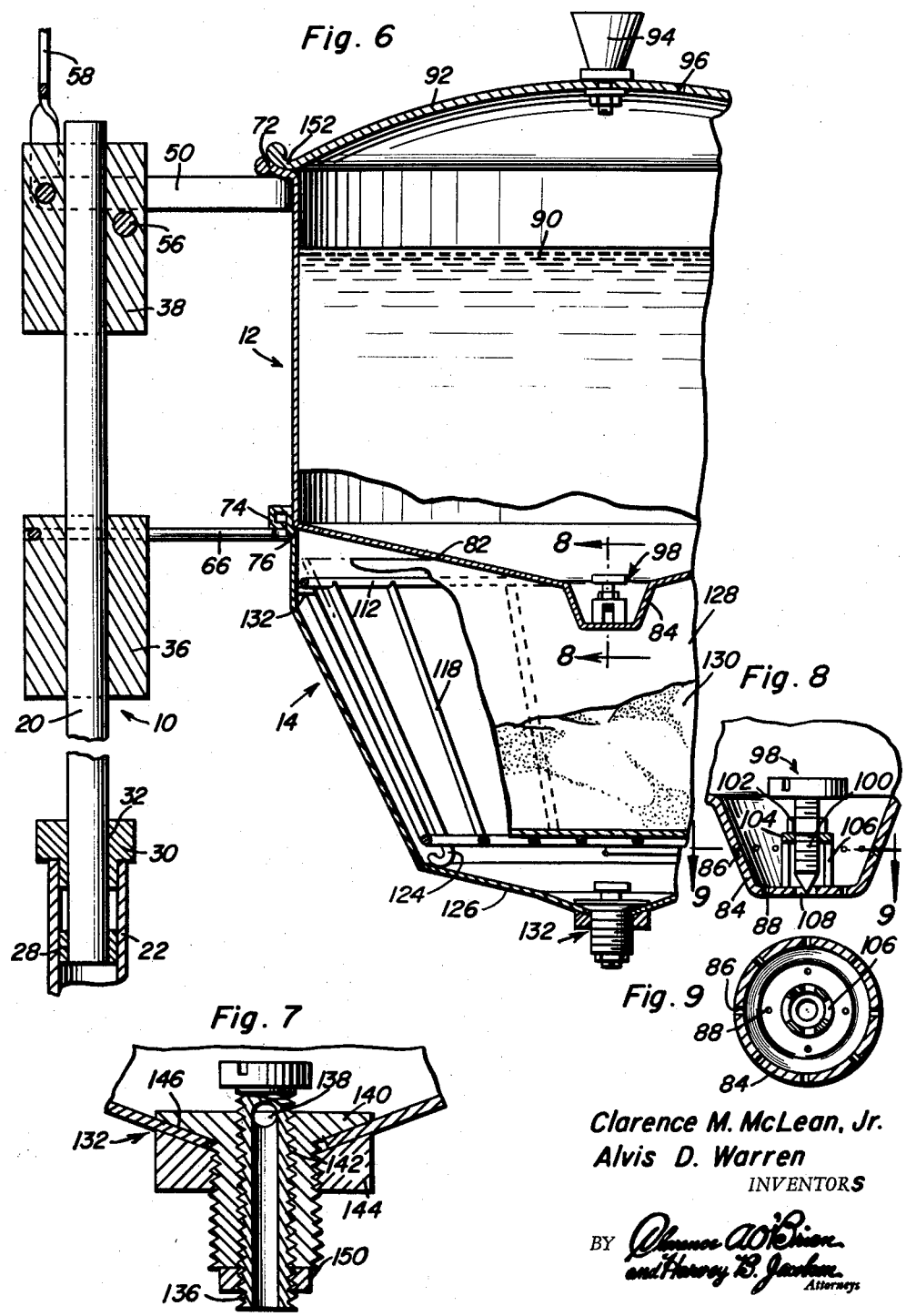

United States Patent Office 3,187,663
Patented June 8, 1965

3,187,663
COFFEE BREWER
Clarence M. McLean, Jr., 1312 San Antonio St., Tyler,
Tex., and Alvis D. Warren, Tyler, Tex. (4434 Hodge
Cove, Memphis, Tenn.)
Filed May 16, 1963, Ser. No. 280,967
11 Claims. (Cl. 99—305)

This invention primarily relates to a coffee brewing apparatus of the drip-type.

It is an object of this invention to provide a coffee brewing apparatus wherein the component parts may be quickly and easily removed for cleaning purposes.

A further object of this invention specifically resides in a novel support means for the apparatus wherein a hot water tank is adapted to be seated upon a coffee brew pot and wherein the hot water tank may be quickly moved to a position allowing removal of the brew pot from the supporting structure.

A still further object of this invention resides in the construction of a novel coffee basket which may be quickly removed and replaced within the brew pot whereby used coffee grounds are easily disposed of.

Yet another object of this invention resides in the detail construction of the hot water tank wherein means are provided in the bottom thereof for distributing hot water in a plurality of fine dispersed streams into said brew pot for insuring complete extraction of all coffee disposed therein.

Another object of this invention is to provide a coffee brewer of the type indicated incorporating control means for regulating the rate of flow of the water streams emanating from the hot water tank and into the brew pot.

A still further object of this invention resides in the provision of means carried by the brew pot for controlling the rate of discharge and brewing time of coffee brewed therein.

A still further object of this invention resides in its simplicity of use, safety and compactness, and almost completely automatic operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side view in elevation of the apparatus.

FIGURE 5 is a sectional view taken substantially along the plane of the line 5—5 of FIGURE 2.

FIGURE 6 is an enlarged fragmentary sectional view taken substantially along the plane of the line 6—6 of FIGURE 1.

FIGURE 7 is an enlarged detail sectional view of the valve in the brew pot for controlling the time of extraction of the coffee therein.

FIGURE 8 is an enlarged fragmentary sectional view taken substantially along the plane of the line 8—8 of FIGURE 6 and illustrates the water distribution system used in the coffee brewing apparatus of the present invention.

FIGURE 9 is a sectional view taken substantially along the plane indicated by the line 9—9 of FIGURE 8.

FIGURE 10 illustrates an alternative embodiment of the supporting means which can be utilized with the coffee brewer of the present invention.

Figure 1:
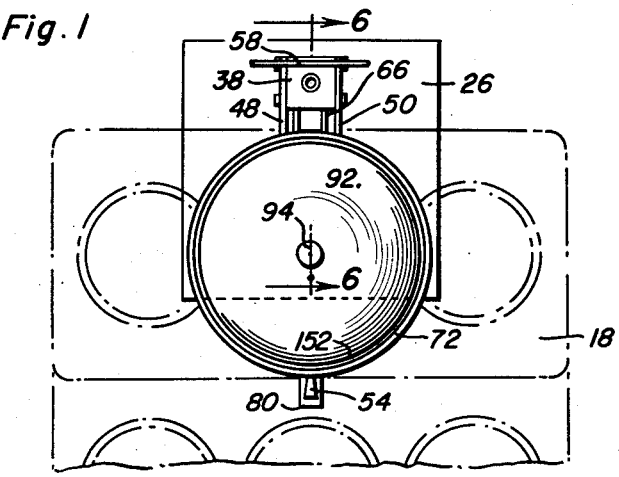
FIGURE 1 is a top plan view of the coffee brewing apparatus comprising the subject matter of the instant invention.

Referring now to the drawings in detail, the coffee brewing apparatus comprises a support generally designated by the numeral 10, a hot water tank 12, and a brew pot 14. The coffee is adapted to be brewed by said apparatus and may be finally disposed in a suitable carafe such as indicated in phantom 16 which may be disposed on a suitable heating stove 18 or the like.

Figure 3:
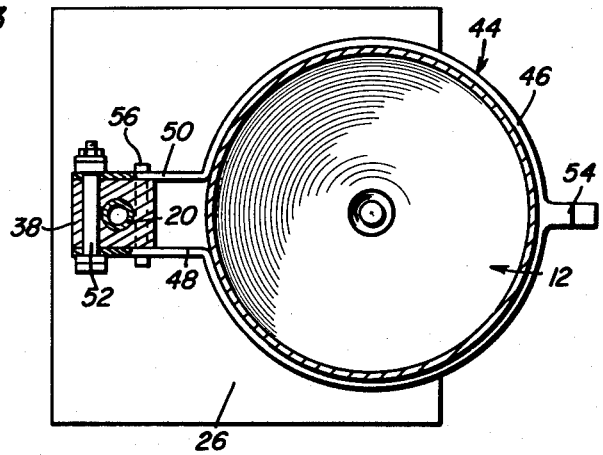
FIGURE 3 is a sectional view taken substantially along the plane of the line 3—3 of FIGURE 2.
Figure 4:
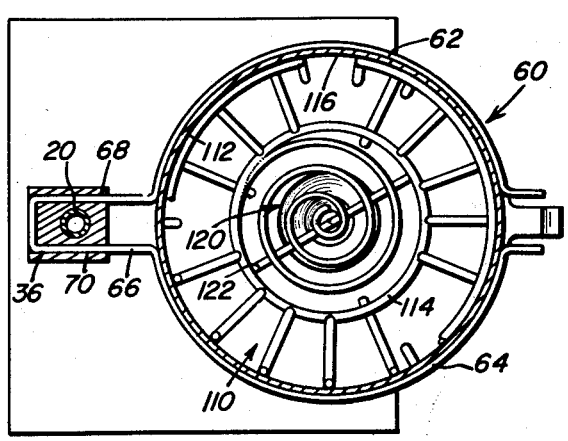
FIGURE 4 is a sectional view taken substantially along the plane of the line 4—4 of FIGURE 2.

The supporting apparatus 10 illustrated in the embodiment of the invention depicted in FIGURES 1 to 9, comprises an upright standard, such as 20, telescopically received within a tubular member 22 suitably mounted as shown at 24 on a base 26. The standard 20 can be vertically and rotatably adjusted due to a sliding connection between it and the interior of the tubular member 22. A bushing such as 28 is disposed at the bottom of the standard and frictionally contacts the walls on the tubular member 22 for guided movement. A locking collar 30 is carried by the upper end of the tubular member 22 and has a bore 32 therethrough for slidably receiving the standard 20. When the standard is adjusted to the desired vertical position a thumb screw 34 may be tightened to retain the standard 20 in adjusted position.

A pair of blocks 36 and 38 are slidably and rotatably mounted upon the standard 20. The blocks 36 and 38 are adapted to be retained at a desired height upon the standard by means of Allen screws 40 and 42 respectively. The upper block 38 mounts a bracket generally designated by numeral 44. The bracket 44 comprises a steel band 46 terminating in a pair of spaced arms 48 and 50. These arms straddle the block 38 and are pivotally attached thereto by means of a hinge pin or bolt 52. The band portion 46 of the bracket 44 further has a suitable handle element 54 mounted thereon for purposes which will hereinafter be described. It will thus be apparent that the bracket 44 is adapted to pivot about a horizontal axis with respect to the block 38 and standard 20. To maintain the bracket 44 in a horizontal position, a dowel pin 56 extends through the block 38 and acts as a seat for the hinge arms 48 and 50. Also, a suitable name plate such as indicated at 58 may have a pair of depending arms attached to each end of the hinge pin 52.

The lower block 36 has a clamping ring generally designated by the numeral 60 mounted thereon. Said ring comprises a pair of semi-circular arms 62 and 64 which are spaced from each other and a U-shaped portion 66. Said ring is formed from a single piece of resilient wire which is bent in the shape of an elongated U and threaded through a pair of apertures 68 and 70 formed in the block 36, then the arms 62 and 64 are formed in the requisite shape as shown more specifically in FIGURE 4.

The water tank 12 is formed with a laterally extending annular rim or flange 72 which is adapted to seat upon the circular portion 46 of the bracket 44. Similarly, the brew pot 14 is formed with an annular flange, such as 74, beneath which the arms 62 and 64 of the clamping ring 60 may be positioned about the brew pot. The brew pot 14 also comprises an internal rim or seat 76 on which the water tank 12 is adapted to seat. Due to this seating arrangement, atmospheric air is prevented from entering the interior of the brew pot 14 to cause oxidation of the volatile aromatics present in the coffee grounds so that the coffee will not take on a bitter taste. It should thus be apparent, that to remove the brew pot 14 for cleaning or repair purposes, all that is necessary is to pivot the bracket 44 about the hinge pin 52 by lifting the handle 54 thereby unseating the water tank 12 from its position on the brew pot 14. The brew pot can then be grasped by means of a handle 80 attached thereto and removed from the clamping ring 60. The procedure may be reversed for replacing the brew pot 14.

The water tank 12 comprises a sloping bottom wall 82 and a centrally located depending well portion 84. Referring to FIGURES 6, 8 and 9, it will be seen that the well 84 has a plurality of small spaced apertures such as 86 extending about the circumference thereof. Furthermore, similar apertures 88 are formed in the bottom of the well. It will be seen that when hot water such as 90 is disposed within the tank 12 by removing the cover 92 by means of the handle 94 thereon, the water will begin to flow out through the openings 86 and 88 in the well 84. Due to the positioning of the apertures 86 and 88, the water in the well which is under pressure due to the water 90 above and the atmospheric air which has been admitted to the interior of the water tank 12 through a vent 96 formed in the cover, will be dispersed in fine streams into the brew pot below. Due to the annular orientation of the apertures 86, practically all or near all of the coffee within the brew pot 14 will be extracted. This will produce a great saving in coffee utilized as compared with conventional brewers and this is especially true where the brewer of the instant invention is used in restaurants which handle and use a large amount of coffee every day. Suitable valve means such as generally designated by the numeral 98 are also disposed in the bottom of the well 84 for controlling the rate of flow of the aforementioned dispersed streams of hot water through the apertures 86 and 88. The valve assembly 98 comprises a suitable needle valve 100 vertically adjustable within a nut 102 carried by the valve housing 104. As should be apparent from FIGURE 8, the valve housing 104 comprises a plurality of openings 106 to allow water to enter the interior of the housing and flow through an orifice 108 which also comprises a valve seat for seating the valve 100. By regulating the size of the orifice 108, the rate of flow of the hot water through the apertures 88 and 86 may be controlled. In other words, by opening the valve 100 more water will be caused to flow through the orifice 108 thereby tending to relieve the pressure pushing water out through the apertures 86 and 88. On the other hand, with the orifice 108 substantially closed, the pressure on the water 90 is increased wherein the water will be forced through said apertures in a fine stream at a high rate of flow.

The brew pot 14 is adapted to mount a coffee receiving basket generally designated by the numeral 110. The basket 110 comprises upper ring 112 and a lower ring 114. As will be seen, the upper ring 112 is of a larger diameter than the lower ring 110 and is split as shown at 116 wherein said ring may be compressed and placed within the interior of the brew pot 14 and released whereupon the ring 112 and basket 110 will spring back snug against the inner walls of the brew pot 14. The upper and lower rings are connected by a plurality of rods 118. Also, the lower ring 114 is formed of a continuous piece of wire which terminates in a spiral 120. Due to this spiral construction of the bottom of the basket 110, a minimum of resistance to the flow of brewed coffee through the bottom of the basket is encountered. The bottom of the basket 110 is braced by a suitable cross-rod as shown at 122 and some of said connecting rods 118 extend beyond the bottom ring 114 as shown at 124 to space the bottom of the basket above the sloping bottom wall 126 of the brew pot and to form supporting legs. A suitable disposable filter element such as filter paper 128 is adapted to be seated in the basket and supports a plurality of coffee grounds 130. It should also be noted that a plurality of lugs such as 132 are spaced below the upper portion of the brew pot to form a stop aiding in precluding the basket 110 from falling out of the brew pot if the brew pot is removed and inverted for some reason. It should now be appreciated, that hot water emanating from the well 84 will be mixed with the coffee grounds 130 supported by the filter paper 128 disposed in the coffee basket 110 whereby the aromatic vapors of the coffee may be extracted by the hot water which subsequently passes through the filter paper 128. Due to the removable coffee basket and filter, the grounds 130 after being used may be quickly and easily disposed of by enclosing them within the filter paper and throwing them away.

The brewed coffee is adapted to pass through the filter paper 128 into contact with the sloping bottom wall 126 of the brew pot. Another suitable valve assembly such as indicated at 132 is disposed in the bottom of the brew pot 14 and controls the rate of discharge and the brewing time of coffee brewed within said brew pot. The valve assembly 132 comprises a hollow threaded member 136 having a pair of entry ports 138 into its interior. The member 136 is adapted to act as a valve through the hollow interior of which the brewed coffee is adapted to pass to the carafe 16. The valve or member 136 is mounted in the bottom of the brew pot 14, by means of a valve body 140 adapted to seat on the bottom portion of the brew pot. The valve member 136 is threaded into the valve body 140 as shown at 142. The valve body 140 is clamped to the brew pot by means of a mounting nut 144 which is adapted to draw the flange 146 of the valve body 140 up tight against the bottom of the brew pot. An adjustment regulating nut 150 may also be threaded upon the threaded shank of the valve 136. Therefore, the rate of discharge of brewed coffee through the hollow interior of the valve 136 and thus the brewing time for the coffee which remains within the brew pot 14 may be varied according to the area of the entry ports 138 communicating with the brewed coffee within the brew pot 14. If a larger area is exposed to the freshly brewed coffee, it should be apparent that a greater flow of coffee from the brew pot may be realized. This also controls the amount of time the coffee remains in the brew pot and therefore this also may be regulated by properly positioning the valve 136 as desired.

Summarizing the operation of the coffee brewer comprising the subject matter of the instant invention, it will be appreciated that all that is necessary to brew a tasty cup of coffee is to pour hot water into the tank 12 by removing the lid or cover 92 comprising an annular flange 152 which rests on the flange 72 of the tank. This is all that is necessary after the coffee grounds 130 have been placed within the basket 110 and the valve assemblies 98 and 132 have been manually regulated. The hot water 90 will be dispersed through the orifices 86 and 88 over all of the coffee grounds 130 within the basket 110. The hot water with the aromatic coffee vapors dissolved therein flow through the filter paper 130 and into the well 134 to be discharged into the entry port 138 in the valve member 136. This whole operation takes only about three and one-half minutes. To place a new supply of coffee grounds in the basket 110, all that is necessary is that the bracket 44 be pivoted to a position wherein the brew pot 14 can be removed. The filter paper 130 containing the used coffee grounds is then removed from the coffee basket 110 and disposed of. The basket 110 need not be removed from the brew pot 14 and in fact is snugly retained therein so it will not fall out. If desired at this point, the brew pot and coffee basket may be rinsed. A new filter paper 128 is disposed within the basket and new coffee grounds placed therein. The hot water tank is once again pivoted to an out-of-the-way position, and the brew pot 14 replaced within the clamping ring 60. The hot water tank 12 is then seated upon the rim 74 and hot water is then added to the tank and the brewing process is started once again. The temperature of the water is maintained at approximately 195° F. well below the boiling point. This is to assure that the volatile aromatics of the coffee are not destroyed by oxidation, that is, their reaction with the oxygen in the water which would be liberated by boiling thereof. If desired, a spacing element such as indicated at 154 in phantom in FIGURE 2 may be employed between the blocks 36 and 38 to assure the proper spacing of said blocks and bracket and clamping ring so that the tank will exactly seat upon the rim 74. It is emphasized again that this is important since it is not desirable to allow atmospheric air to enter the brew pot after the process has begun.

Referring now to the embodiment of the support structure illustrated in FIGURE 10, it will be seen that the standard 20 may be threaded at one end thereof as indicated at 158. In lieu of mounting the standard 20 in a telescopically receivable member such as 22, the standard 20 is retained in a bracket such as 160 fastened to the rear of the stove 18. Said bracket 160 comprises a U-shaped member having a bight 162 and a pair of laterally extending legs 164 and 166. The standard 20 is adapted to pass between aligned apertures in each one of said legs and retain them in position by a pair of lock nuts such as 168 and 170.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A coffee brewing apparatus comprising a base, a standard supported at its lower end from said base, lower elongated arm means, first mounting means mounting one end of said lower arm means on said standard with said lower arm means projecting generally horizontally outwardly from one side of said standard and spaced above said base, an open top brew pot supported from the free end of said lower arm means and including an outlet in its lower end through which brewed coffee is adapted to be passed into a suitable open top container disposed below said outlet, elongated upper arm means, second mounting means pivotally mounting one end of said upper arm means to a portion of said standard disposed above said lower arm means for rotation about a horizontal axis extending transversely of said standard and swinging movement of the free end of said arm means through a plane between a first lowered and operative horizontally disposed position with the outer end of said upper arm means disposed above said brew pot and a second raised inoperative position with the outer end of said upper arm means swung upwardly from said first operative position, a hot water tank supported from the free end of said upper arm means and including an outlet in its lower portion, the upper and lower portions of said brew pot and hot water tank, respectively, being formed so as to enable the lower end portion of said hot water tank to be seatingly and sealingly engaged with the open upper end of said brew pot when said upper arm means is swung to said first horizontally disposed operative position.

2. The combination of claim 1 wherein said first and second mounting means are mounted on said standard for vertical adjustment therealong independently of each other.

3. The combination of claim 2 wherein said first and second mounting means also include means rotatably supporting said mounting means from said standard and means for releasably retaining said mounting means in adjusted rotated position about the longitudinal axis of said standard.

4. The combination of claim 1 including a resilient coffee basket snugly received in said brew pot and filter means for retaining coffee grounds disposed in said coffee basket for retaining coffee in said basket but allowing brewed coffee to pass therethrough.

5. The combination of claim 4 wherein said brew pot outlet includes means for controlling the rate of discharge of brewed coffee therefrom and therefore the brewing time of coffee within the brew pot.

6. The combination of claim 1 wherein said upper arm means defines a ring-like member at its outer end, said hot water tank being of a configuration to be telescopically received downwardly through said ring and including laterally outwardly projecting abutment means at its upper end portion engageable with said ring-like member for supporting said water tank from said ring-like member.

7. The combination of claim 1 including a resilient coffee basket snugly received in said brew pot and filter means for retaining coffee grounds disposed in said coffee basket for retaining coffee in said basket but allowing brewed coffee to pass therethrough, means in the bottom of said hot water tank for distributing hot water in a plurality of fine dispersed streams into said brew pot thereby insuring complete extractions of all coffee disposed therein, said brew pot outlet including manually actuatable valve means adjacent said distributing means for regulating the rate of flow of the dispersed streams of hot water through said distributing means and manually actuatable regulating means operatively associated with the outlet of said brew pot for controlling the rate of discharge of brewed coffee therefrom and therefore the brewing time of said coffee in said brew pot.

8. The combination of claim 7 wherein said hot water tank includes a sloping bottom wall, said distributing means including a well centrally located and depending from said bottom wall, a pluality of apertures spaced about the walls of said well, said manually actuatable valve means seated in the bottom of said well and regulating the flow of water through said apertures.

9. The combination of claim 1 wherein said brew pot has a wire basket supported therein and includes removable filter means retaining coffee grounds in said brew pot but allowing brewed coffee to pass therethrough, said coffee basket comprising a pair of vertically spaced wire rings, wire rods connecting said rings and spaced circumferentially thereabout, the upper ring being of a larger diameter than the lower ring and split to render said basket resilient, the end of the lower ring being continuously wound in a spiral to enable brewed coffee to pass therethrough and encounter a minimum of resistance.

10. The combination of claim 1 wherein the outer end of said lower arm means defines a split resilient ring-like member, said brew pot including a lower end portion of a size and configuration telescopically receivable downwardly through said split ring-like member, and lateral outwardly projecting abutment means carried by an upper portion of said brew pot engageable with said split ring-like member for supporting said brew pot therefrom.

11. The combination of claim 1 wherein said standard includes upper and lower telescoped sections and means for retaining said upper section in adjusted extended positions relative to said lower section, said first and second mounting means each being carried by said upper section of said standard.

References Cited by the Examiner
UNITED STATES PATENTS

| | | | |
|---|---|---|---|
| 1,480,413 | 1/24 | Pedersen | 210—485 |
| 1,826,474 | 10/31 | Kohler | 248—124 |
| 2,245,389 | 6/41 | Cremer | 99—306 X |
| 2,268,633 | 1/42 | Aske | 99—315 X |
| 2,524,243 | 10/50 | Wicklund | 248—122 |
| 2,844,088 | 7/58 | Von Wertaur | 99—306 X |
| 2,951,431 | 9/60 | Hugentobler | 99—304 X |
| 3,034,417 | 5/62 | Bunn. | |

ROBERT E. PULFREY, *Primary Examiner.*

JEROME SCHNALL, *Examiner.*